United States Patent [19]
Hull et al.

[11] Patent Number: 6,018,591
[45] Date of Patent: *Jan. 25, 2000

[54] SCRIBBLE MATCHING

[75] Inventors: Richard Hull; David Reynolds; Dipankar Gupta, all of Bristol, United Kingdom

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/974,704

[22] Filed: Nov. 19, 1997

Related U.S. Application Data

[63] Continuation of application No. 08/484,148, Jun. 7, 1995.

[30] Foreign Application Priority Data

Jul. 4, 1994 [EP] European Pat. Off. .............. 94304890

[51] Int. Cl.[7] .............................. G06K 9/18; G06K 9/00; G06K 9/46

[52] U.S. Cl. .......................... 382/186; 283/187; 283/192; 283/122

[58] Field of Search ...................................... 382/122, 120, 382/186, 187, 188, 138, 175, 192

[56] References Cited

U.S. PATENT DOCUMENTS

| | | | |
|---|---|---|---|
| 4,020,463 | 4/1977 | Himmel | 382/242 |
| 4,524,456 | 6/1985 | Araki et al. | 382/242 |
| 4,653,107 | 3/1987 | Shojima et al. | 382/189 |
| 4,718,103 | 1/1988 | Shojima et al. | 382/189 |
| 4,807,143 | 2/1989 | Matsuvra | 382/201 |
| 4,969,201 | 11/1990 | Takasaki et al. | 382/199 |
| 5,023,913 | 6/1991 | Lipscomb | 382/260 |
| 5,126,948 | 6/1992 | Mitchell et al. | 364/474.03 |

(List continued on next page.)

FOREIGN PATENT DOCUMENTS

| | | | |
|---|---|---|---|
| 0 447 176 A2 | 9/1991 | European Pat. Off. | G06F 15/72 |
| 0 678 833 A2 | 10/1995 | European Pat. Off. | G06T 9/00 |
| 195 31 392 C | 1/1997 | Germany | G06K 9/48 |
| WO 94/03853 | 2/1994 | WIPO | G06F 3/14 |

OTHER PUBLICATIONS

"The State of the Art in On–Line Handwriting Recognition" C. C. Tappert et al., IEEE Transactions on Pattern Analysis and Machine Intelligence, vol. 12, No. 8 (1990).

Daniel P. Lopresti & Andrew Tomkins. "Pictographic naming." Technical Report 007–mei–ptil–mitl–228–1, Matsushita Information Technology Laboratory, Princeton, Nov., 1992.

Daniel P. Lopresti & Andrew Tompkins. "A comparison of techniques for graphical database queries." Technical Report MITL–TR–45–93, Matsushita Information Technology Laboratory, Princeton, May, 1993.

(List continued on next page.)

*Primary Examiner*—Thomas D Lee
*Assistant Examiner*—Wenpeng Chen

[57] ABSTRACT

The present invention relates to scribble matching methods, ie. methods for searching samples of electronic ink without having first to translate the ink into ASCII text. The methods of the present invention find application in pen-based computer devices. The invention entails the identification and encoding of velocity minima in the input scribble. Three scribble matching algorithms are described—a syntactic matcher, a word matcher and an elastic matcher. The syntactic matcher encodes the input scribble according to the shape of the scribble in the region of the velocity minima. The word matcher encodes the input scribble according to the heights of the velocity minima from a reference line, using a continuous height encoding scheme. The elastic matcher encodes the input scribble according to a classification of the velocity minima and intermediate points. The use of velocity minima in the encoding of scribble input provides a stable set of points and leads to improved performance in comparison with known scribble matching methods.

29 Claims, 6 Drawing Sheets

U.S. PATENT DOCUMENTS

| | | | |
|---|---|---|---|
| 5,392,363 | 2/1995 | Fujisaki et al. | 382/187 |
| 5,467,407 | 11/1995 | Guberman et al. | 382/186 |
| 5,473,742 | 12/1995 | Polyakov et al. | 395/142 |
| 5,581,655 | 12/1996 | Cohen et al. | 395/2.54 |
| 5,623,555 | 4/1997 | Nelson et al. | 382/141 |

OTHER PUBLICATIONS

Thierry Paquet & Yves Lecourtier. "Recognition of handwritten sentences using a restricted lexicon." Pattern Recognition. 26(3) : 391–407, 1993.

Information Theory, Aug. 29, 1960, London, GB pp. 300–316, LS Frishkopf et al 'Machine reading of cursive script' *p. 301, line 27–line 29*.

Int Neural Network Conf. vol. 1, Jul. 9, 1990, Paris FR—pp. 141–144, XP145254 P Morasso et al 'Self–organization of an allograph lexicon' Section "1, Introduction", Section "2.1 Segmentaton module".

Pattern Recognition, vol. 26, No. 3, 1993, pp. 451–460, XP367317 P. Morasso et al. 'Recognition experiments of cursive dynamic handwriting self–organizing networks', Section "2. Preprocessing" *figure 1*.

Pattern Recognition, vol. 26, No. 3, 1993—pp. 391–407, XP367312, T Paquet et al 'Recognition of handwritten sentences using a restricted lexicon', p. 401 Section "4.3.2 Normalizing the editing costs".

1990 IEEE Int. Conf. on Systems, Man and Cybernetics, Nov. 4, 1990 Los Angeles, CA, pp. 835–838, XP215462 DW Fincher et al "Multi–sensor data fusing using neural networks" *p. 836, left col., line 41–line 55; figure 5*.

FIG. 1
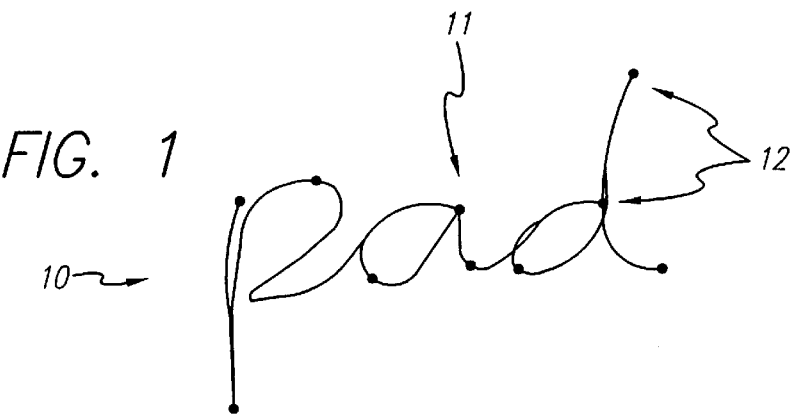
FIG. 2
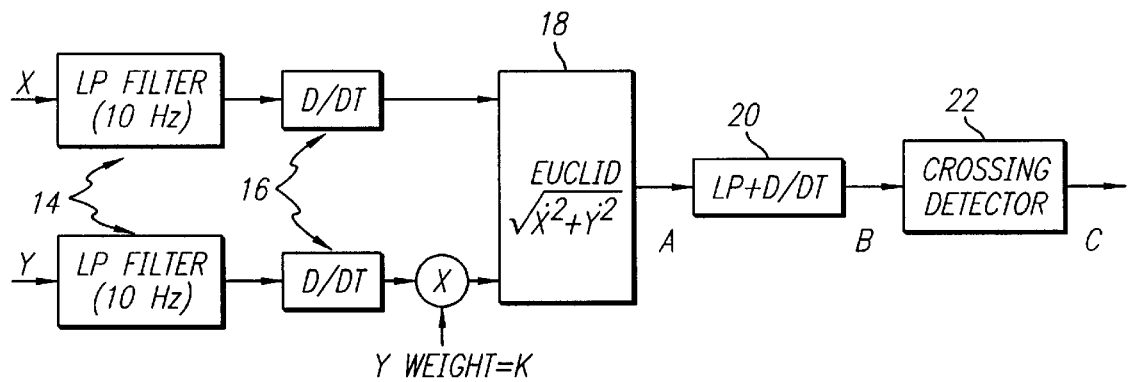
ORIGINAL INK TRACE:
VELOCITY TRACE:
ACCELERATION TRACE:
KNOT POINTS DETECTED:
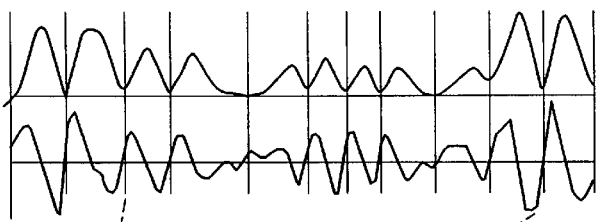
FIG. 3

ORIGINAL INK

POLYGONAL SEGMENTS

ORIGINAL INK

FIG. 11
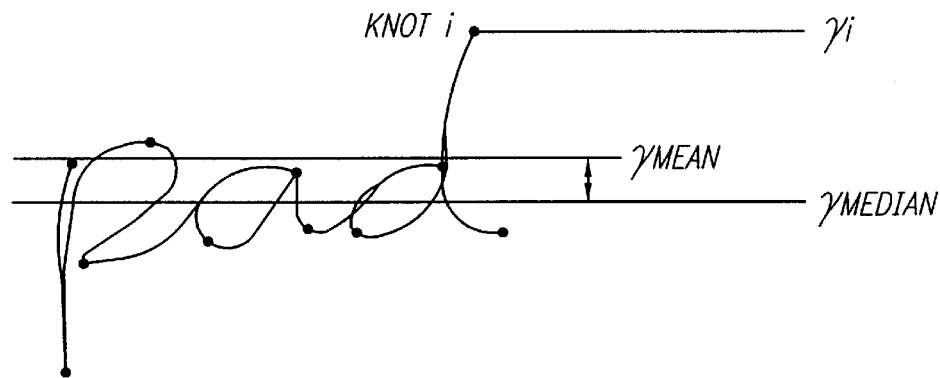
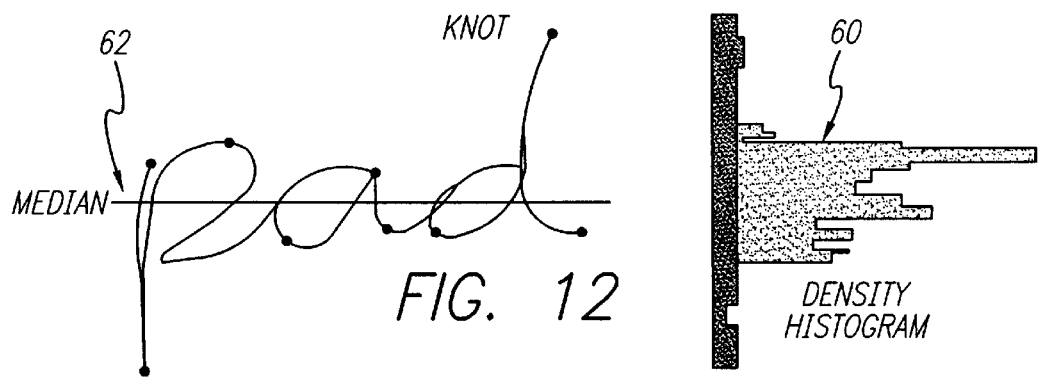
FIG. 12
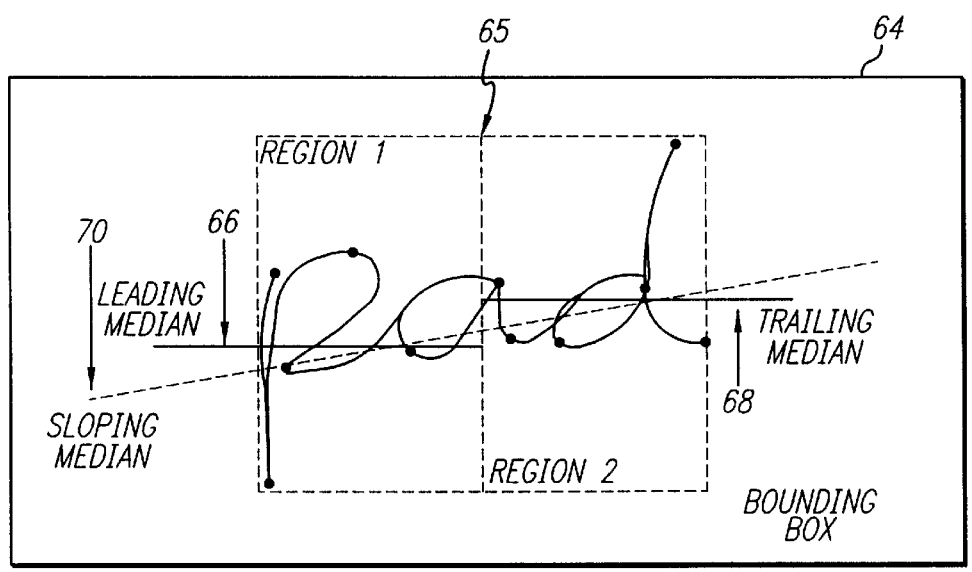
FIG. 13

| TYPE | KNOT | RESAMPLED | PENLIFT |
|---|---|---|---|
| KNOT | M=1, N=1 | M=2, N=2 | M=3, N=3 |
| RESAMPLED | M=2, N=2 | M=1, N=1 | M=3, N=3 |
| PENLIFT | M=3, N=3 | M=3, N=3 | M=1, N=1 |

| TYPE | KNOT | RESAMPLED | PENLIFT |
|---|---|---|---|
| COST | 3 | 2 | 6 | ns
SCRIBBLE MATCHING

This is a continuation of co-pending application Ser. No. 08/484,148 filed Jun. 7, 1995.

TECHNICAL FIELD

The present invention relates to a method and apparatus for searching samples of electronic ink without having first to translate the ink into ASCII text. By 'electronic ink' is meant the dynamic trace produced by a user when using a computer input device that captures freehand input, such as a pen-based computer. This technique will be referred to in the descriptive part of this patent application as 'scribble matching'.

BACKGROUND ART

There are many known systems for recognising handwritten input to a pen-based computer system. Such systems normally entail recognising the individual characters in the input and converting these to ASCII text for subsequent storage and manipulation by the system. This involves a substantial computing overhead which increases with the recognition accuracy required. In known systems the recognition accuracy is rather limited for unconstrained input.

It is known in some handwriting recognition systems to locate the velocity minima in the input and to use this information to segment the input into strokes as a step in the recognition process.

Scribble matching has several advantages over full handwriting recognition followed by searching the resulting ASCII text:

i) for a personal device in which the search is comparing a user's input with previous input of the same user, the matching accuracy is higher. Handwriting recognition is currently limited in its ability to cope with the huge variety of letter forms which people employ when writing naturally. Scribble matching simply requires the user to be reasonably consistent in the letter forms which they use—it does not matter if that letter form is not recognisable per se;

ii) for relatively small search lists of a few hundred entries of unconstrained writing, scribble matching is computationally cheaper than translation to ASCII text;

iii) the writer is not restricted to a particular letter set but can use arbitrary symbols without any need to train the system. Small iconic pictures, personal symbols, symbols from other languages can all be used as long as they are sufficiently distinct and stable.

The following papers describe known scribble matching methods:

Daniel P. Lopresti and Andrew Tomkins. Pictographic naming. Technical Report 007-mei-pti-mitl-228-1, Matsushita Information Techology Laboratory, Princeton, November, 1992.

Daniel P. Lopresti and Andrew Tomkins. A comparison of techniques for graphical database queries. Technial Report MITL-TR45–93, Matsushita Information Techology Laboratory, Princeton, May, 1993.

Thierry Paquet and Yves Lecourtier. Recognition of handwritten sentences using a restricted lexicon. *Pattern Recognition*. 26(3):391–407, 1993.

The first two references relate to matching against pictograms which is a difficult problem due to significant within-writer variation. They describe the use of Hidden Markov modelling which is a statistical pattern recognition technique. The third reference describes matching offline ie static, scribble images which is a different problem from the one addressed by the present invention. The methods described in all three references give relatively poor accuracy.

DISCLOSURE OF INVENTION

According to the present invention we provide a method of matching a sample of electronically stored freehand input with other stored samples of freehand input comprising:

locating the velocity minima in the freehand input;

encoding the freehand input using a sequence of symbols each representing a feature of the freehand input at a velocity minimum;

matching the sequence against the codes of other samples of freehand input using a string edit distance metric.

The invention circumvents the problems of full handwriting recognition by matching scribbles according to topological and/or temporal features and achieves relatively high matching rates.

The use of velocity minima in scribble matching provides a relatively stable set of points on each sample for matching that sample against other samples. In addition, the use of velocity minima means that a relatively small set of points is used to encode scribble input thereby saving on storage and computing power. Scribble matching methods according to the present invention show improved performance in comparison with known methods.

A method according to the invention may be used in a wide range of applications. Examples of these are matching handwritten entries in an electronic telephone book, file retrieval eg. note or document retrieval, and searching within a document of handwritten electronic notes.

The feature encoded may be the shape of the freehand input in the region of the velocity minima and the symbols may represent a plurality of shape characteristics.

The following set of shape characteristics may be used for encoding:

cusp, open curve, closed curve and line end wherein the edit costs are dependent on the shape characteristics.

Preferably the substitution costs between fine ends and the above curve characteristics is relatively low.

The set of shape characteristics may also include miscellaneous smooth curve and diacritical mark and the insetion and deletion costs for these characteristics are relatively low.

This particular set of features has been found to produce good results and masks some of the inevitable within-writer variability. The edit costs are tailored according to the features to be inserted, deleted or substituted so that the significance of each such edit operation for each feature is properly taken into account.

Preferably, the edit costs are also dependent on the probability of occurence of the corresponding edit operations. This feature exploits the correlation between the chance of a variation occuring and the affect of the variation. Thus the more likely sources of variability, such as deformation of loops into cusps, contributes less to the distance between two samples than unlikely and significant deformations.

In another embodiment, the method of the invention comprises encoding the normalised height of the freehand input at the velocity minima relative to a reference line, wherein the height is encoded on a continuous scale and the edit costs are dependent on the encoded heights.

This embodiment uses a representation of the pattern of ascenders and descenders of words as the basis for matching.

It does this by generating a code vector of heights with one entry for each knot point in the ink. The heights of the knots are represented by their normalised distance from a median line.

In some systems, the strokes are categorised into discrete categories such as 'ascender', 'descender' or 'body'. A problem with this approach is that two points which are relatively close together but which fall on either side of a dividing line can be differently classified thereby exaggerating their dissimilarity.

By using a continuous height encoding scheme, rather than simply classifying velocity minima as 'ascender', 'descender' or 'body part', reduction in accuracy due to borderline classifications exaggerating the dissimilarity of features is avoided.

The edit costs for deletion and insertions preferably correspond to the magnitude of the encoded heights of the relevant velocity minima and the edit costs for substitutions preferably correspond to the difference in height of the relevant velocity minima.

In a further embodiment the method according to the invention comprises:

coding the freehand input by a sequence of symbols which also represent features of points intermediate the velocity minima, wherein the intermediate points are generated by a re-sampling of the freehand input between velocity minima;

encoding the velicity minima and the intermediate points by a triple containing the normalised height of the point, the angle to the tangent of the freehand input at the relevant point, and a classification of the point as a break in electronic ink, a velocity minimum or an intermediate point, and using edit costs dependent on the height, angle and point classification.

In the embodiment to be described, polygonal re-sampling is used.

This embodiment matches the shape of the entire scribble, not just the shape of the scribble in the region of the velocity minima thereby utilising information about the shape of the freehand input between velocity minima that provides additional discrimination between strokes.

Preferably, the results of using the three matchers defined above are combined by calculating a weighted sum of the individual match scores to obtain an overall match score.

BRIEF DESCRIPTION OF DRAWINGS

Preferred embodiments of the present invention will now be described, by way of example, with reference to the accompanying drawings in which:

FIG. 1 shows a piece of scribble and indicates the knot points;

FIG. 2 illustrates the process of knot detection;

FIG. 3 illustrates the sequence of traces in knot detection;

FIG. 11 illustrates the components of a wordshape code;

FIG. 12 illustrates the density histogram for deriving the median line;

FIG. 13 illustrates aspects of slope correction;

Figure 4:
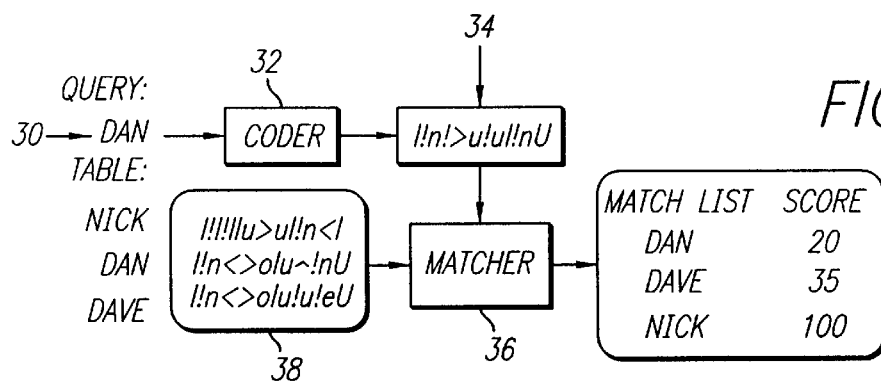
FIG. 4 illustrates the basic (known) process of scribble matching.

Three scribble matching algorithms according to the present invention will be described.

Before describing these in detail, an overview of the scribble matching process and of the pre-processing steps will be given. This overview consists of material which forms part of the state of the art.

Overview

Scribble matching entails encoding each scribble input and matching the coded input against codes of stored scribbles. Preferably, the codes for the stored scribbles will have been pre-computed and stored in a search table.

Each scribble matching algorithm has two components—a coder and a matcher. The coder part is used each time a new scribble code is added to the search table. It extracts a set of features from the scribble data which represent some aspect of the writing which is sufficiently stable to be useful in performing the search. These extracted codes are stored in some form of search table ready to be used during retrieval.

The matcher part is used when a search is to be performed. It compares the code of the query word against the codes in the search table. The code of the query will only rarely be an exact match against an item in the search table due to variability in the user's writing. Therefore the matcher must employ some form of approximate matching to measure how similar the query code is to each entry in the search table. The result is a set of distance scores for each entry in the search table which can be used to produce an ordered list of possible matches.

Each of the coding schemes in the algorithms to be described is based on labelling a set of points, known as 'knot points', in the input scribble. These knot points represent significant points in the input ink trace eg end points, cusps, ligatures etc. FIG. 1 illustrates a piece of scribble 10, the word 'pad', showing knot points 12. Each coder generates codes for each of the knot points 12 and/or for the stroke segments between knot points 12. The process of knot detection is illustrated in FIG. 2.

Referring to FIG. 2, knot point detection can be broken down into the following stages:

1. The x and y coordinate streams are first low pass filtered at 14 with a cut off frequency of 10 Hz to reduce noise. A simple integer finite impulse response filter suffices for this step—assuming the stream of data coordinates is sampled uniformly in time. For a sample rate of 10 Hz the filter coefficients [2 6 12 18 20 18 12 6 2] may be used.

2. The filtered coordinate streams are then differentiated at 16 to derive their rate of change using a central difference operator $x'_n = x_{n+1} - x_{n-1}$. In practice, steps 1 and 2 are carried out together by convolving the coordinate stream with the combined filter kernel [−2 −6 −10 −12 −8 0 8 12 10 6 2].

3. The separate x and y rates of change are then combined at 18 to give the speed of the pen along its trajectory:

$$v = \sqrt{\dot{x}^2 + (k\dot{y})^2}$$

where k is a constant weight. Experiments have indicated k=3 as opumum. In fact rather than calculate the relatively expensive square roots we use the Chebyshev approximation to this formula:

$$v = \begin{cases} \dfrac{(96|\dot{x}| + 40k|\dot{y}|)}{100} & |\dot{x}| > k|\dot{y}| \\ \dfrac{(96k|\dot{y}| + 40|\dot{x}|)}{100} & |\dot{x}| \le k|\dot{y}| \end{cases}$$

4. The minima of this velocity trace are then used as the knot points. The minima are located by smoothing (using a 20 Hz low pass filter) at 20 and differentiating the velocity trace and then looking at 22 for zero crossings in the resultant acceleration trace. The location of the zero crossing can be inaccurate by one sample point due to discrete rounding errors so the neighbours of each zero crossing are checked to see if they correspond to a lower minimum velocity.

The sequence of traces produced during knot point detection is shown in FIG. 3.

The basic scribble matching process is illustrated in FIG. 4. A query scribble 30 is provided to a coder 32 which produces an encoded form 34 of the query scribble 30. The encoded scribble 34 is provided to a matcher 36 which computes distance scores for the encoded scribble 34 and each of the entries in a search table 38.

Each of the matchers to be described uses the same approach to approximate matching—that of string edit distances computed via dynamic programming. The implementation of the underlying dynamic programming engine is standard and utilises a limited beam width set by the invoking matcher. Examples of papers describing this approach are Okuda et al "Correction of garbled words based on Levenstein metric" in the IEEE transactions on computing, C-25(2), February, 1976 and R. A. Wagner and M. J. Fisher "The string-to-string correction problem"—Journal of the Association for Computing Machinery, pg 2168, 1974.

The notion of edit distance is most easily thought of in terms of matching two strings (one for the code of the query scribble and one for the candidate target scribble) although in fact the dynamic programming matchers use a wide variety of symbols, not simply character labels. The edit distance metric defines the distance between the strings as the minimum cost of editing the first string into the second string. We assume that we have three primitive edit operations available:

Insertion of a symbol $S_i$ with cost ins($S_i$)

Deletion of a symbol $S_i$ with cost del($S_i$)

Substitution of a symbol $S_i$ with a new symbol $S'_i$ with cost subs($S_i$,$S'_i$)

For any given pair of strings there will be an arbitrary number of different edit sequences which could convert one string into the other and the metric is defined as the minimum edit cost over all these possible sequences.

For example, suppose we are trying to match the two strings abbbc and acbb and edit operations of insertion/deletion/substitution cost 1,1,2 respectively. Then the edit distance between these two strings is 3, corresponding to substituting the first b for c and deleting the final c. In each of the three scribble matchers to be described the set of edit costs depend upon the particular symbols being inserted, deleted or substituted.

The algorithm used for calculating edit distances is that of dynamic programming. This algorithm is most easily thought of in terms of a two dimensional array of costs (see the table in FIG. 18). Given two strings $a_{1 \ldots n}$ and $b_{1 \ldots m}$ then entry d(i,j) in the table gives the lowest cost so far, i.e. the cost of edit the substring $a_{1 \ldots i}$ into $b_{1 \ldots j}$. We can then simply calculate the d(i,j) entries in one pass of the table using the formulae:

$$d(i, j) = \min \begin{cases} d(i-1, j) + del(a_i) \\ d(i-1, j-1) + subs(a_i, b_j) \\ d(i, j-1) + ins(b_j) \end{cases}$$

$$d(0, 0) = d(\perp, \perp) = 0$$

Where ⊥ represents the null string.

Figures 17, 18:
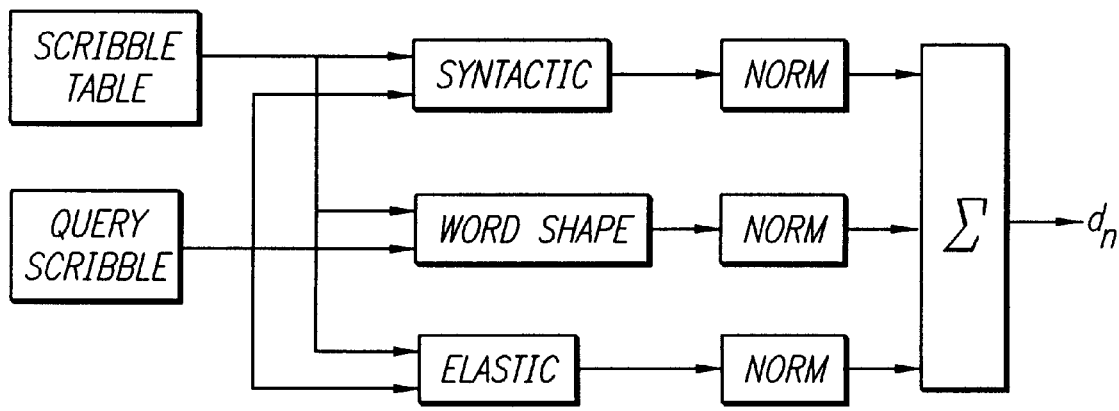
FIG. 17 shows the combination of the results of the three matchers to obtain an overall matching score.
FIG. 18 is a table which shows an array of dynamic programming costs.

The final edit distance is then the bottom right hand corner of the table in FIG. 18.

In the implementation of the algorithm used in the scribble matchers this full table is never explicitly constructed, at most only two rows of the table are needed—the one being updated and the previous one. Furthermore, the area of the table scanned is limited to a finite beam ie. only the cells which are within some small distance of the diagonal of the table are considered. This beam limiting reduces the cost of calculating the edit distance from $O(n^2)$ to O(nb) where n is the length of the strings and b is the beam size which may be 5 to 10 times smaller than n (where O stands for 'order of').

In each of the scribble matchers to be described the matching distance is normalised by dividing it by the average of the lengths of the two strings being matched. This "edit cost per point measure is less biased towards short match strings and in practice provides a small but useful improvement in accuracy.

Figure 5:
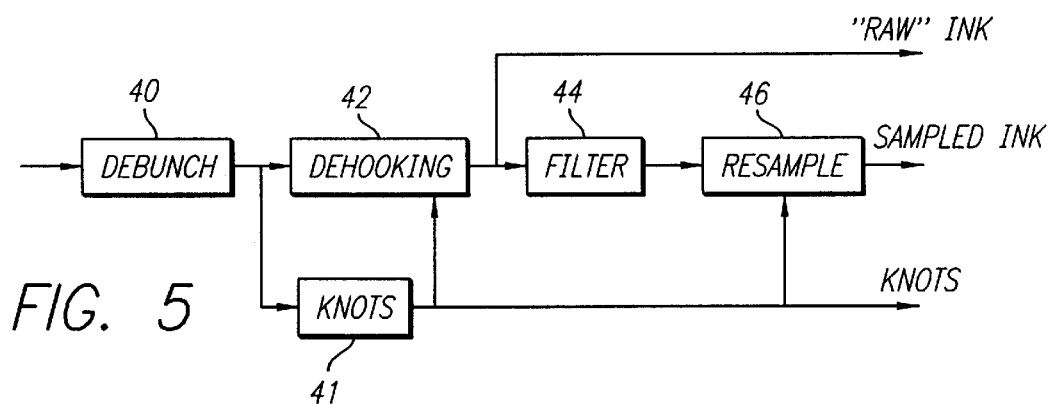
FIG. 5 illustrates preprocessing steps.

In addition to knot detection, there are other preprocessing steps which need to be performed before the basic scribble matching process and these are represented in FIG. 5.

The first step is a debunching step 40.

On some platforms, the ink sample points may be incorrectly time stamped which disrupts the velocity-based processing. In particular, on a Windows platform it is possible to capture ink coordinates via the mouse driver instead of using a special pen driver. In this case the ink coordinates arrive in bunches with identical timestamps. A simple preprocessing step is used to correct the time stamp of the individual samples on the assumption that they are equally spaced through the time period represented by the bunch.

Suppose we receive a series of points: $(p_1,t_1)$, $(p_2,t_1)$ . . . $(p_n,t_1)(p_{n+1},t_2)$ . . .
then the debunching algorithm calculates $\Delta t=(t_2-t_1)/n$ and then re-labels the points in the sequence as:

$$(p_1,t_1),(p_2,t_1+\Delta t) \ldots (p_n,t_1+(n-1)\cdot\Delta t)(p_{n+1},t_2) \ldots$$

The next step is a dehooking step 42.

A very common artefact in handwriting captured by a digitising tablet is the hook. This arises when the pen starts inking before the writer's hand has quite reached the position where he/she intended the stroke to start. Such hooks are quite unstable—for the same person writing the same word several times, the number of hooks found will vary significantly. Thus if the scribble coding were affected by hooks, this source of variation would reduce the scribble match accuracy. Thus it is worth preprocessing the ink to remove such hooks.

Normally the knot detection process, indicated at 41 in FIG. 5, will locate a knot at the cusp corresponding to the intended start of the stroke. The dehooking algorithm thus considers just the first and last segment of each stroke. It decides that such a segment is a hook and removes it if:

$$(l_0 < 1 \text{ mm}) \vee ((l_0/scale < 0.25) \wedge (\alpha < 45°))$$

where $l_0$=the length of the hook, $$(l_0 < 1\text{mm}) \vee \left( \left( \frac{l_0}{scale} < 0.25 \right) \wedge (\alpha < 45°) \right)$$

$\vee$ = the symbol for logical OR, $\wedge$ = the symbol for logical AND, scale = the maximum of the height/width of the bounding box for the stroke being dehooked, and $\alpha$ = the angle which the hook subtends to the main stroke.

The precise parameters (1 mm, 0.25 and 45) were chosen after experimentation on a range of example data. The optimum values will depend up the characteristics of the handwriting capture system (pen compliance, hysteresis in pen down detection, surface friction, writing area—which affects writing size).

The next step is a filtering step 44.

The same 10 Hz low pass filter step which is used to reduce noise before velocity detection is also used to smooth the ink for later processing. Some algorithms, notably the word shape matcher, are slightly more accurate when they use unfiltered ink in which case this filtering step is omitted from the preprocessing stages.

The next step is a resampling step 46.

Having extracted the detailed time-dependent information, it is useful next to resample the ink to simplify (and reduce the cost of) later processing. Out of several possible resampling techniques, the most useful general purpose technique for scribble matching purposes is polygonal resampling. This technique is commonly used in handwriting recognition. It replaces a complex curve by a series of line segments which closely approximate the full curve. In the embodiment to be described, the knot points are treated as fixed and only the segments between successive knot points are polygonally resampled.

Figure 6:
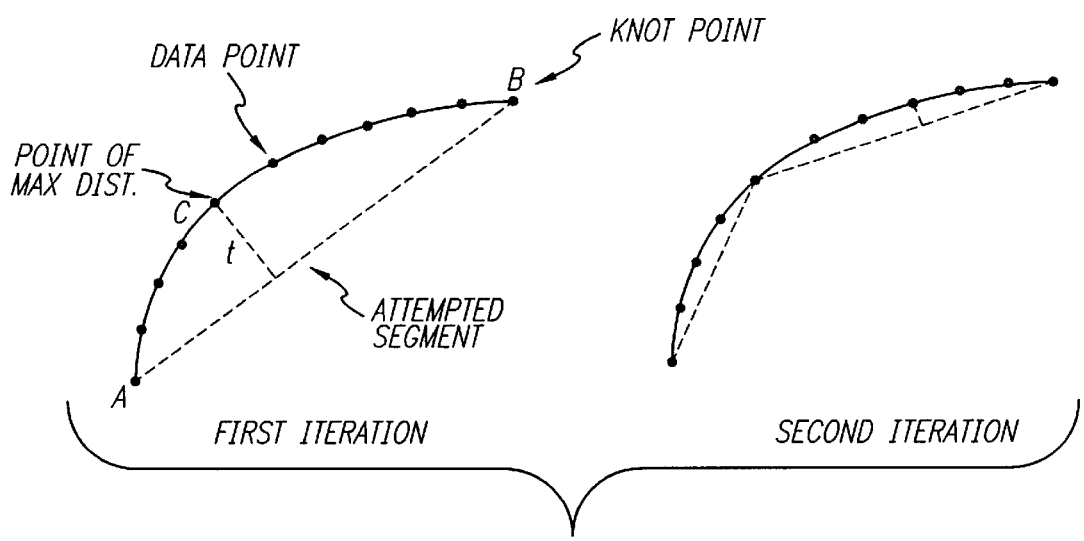
FIG. 6 illustrates polygonal resampling using recursive division.

The algorithm used is that of simple recursive division as illustrated in FIG. 6.

A segment AB of ink is to be resampled. Initially this will be the segment between two successive knot points. The core of the resampling algorithm is as follows:

1. Assume a straight segment between A and B.
2. Locate the data point at maximum distance (t) from AB, this is C in FIG. 6.
3. If t< Threshold then exit (AB is a sufficiently close approximation)
   else add C as a vertex and recursively resample AC and CB.

The implementation may be optimised as follows to speed up this basic approach:

If the line AB has gradient m and we place A at (0,0) then:

$$t=|y-mx|/h$$

where (using the Chebyshev approximation again):

$$h = \sqrt{1+m^2} \approx a + b|m| \quad \begin{cases} a = 0.96, b = 0.4 & |m| \leq 1 \\ a = 0.4, b = 0.96 & |m| > 1 \end{cases}$$

Thus in the search step 2, h can be calculated using simple integer arithmetic. Furthermore, h is independent of the point being tested so that it can be calculated once outside the inner loop of the search.

Since the curve segments are mostly simple convex and roughly symmetrical, the search starts in step 2 by hill climbing from the mid data point between A and B and first finding the local maximum. Only if this local maximum passes the distance test are checks made for other maxima.

The 'Threshold' parameter determines how closely the polygonal approximation matches the original ink. Reducing this parameter increases accuracy of the approximation and increases the number of polygonal segments (thus increasing store cost and search times).

A parameter setting of 0.1 mm was used for all the embodiments to be described. This gives a fairly tight approximation to the curve and yields a data reduction of 3.6 to 1.

Best Mode for Carrying Out the Invention & Industrial Applicability

Syntactic Matcher

The first embodiment of the present invention which will be describe is the syntactic matcher. The syntactic matcher encodes scribbles by labelling each of the knot points with a symbol representing the shape of the scribble in the locality of the knot point. The particular labels used are:

cusps: I !<> for up, down, left and right facing cusps;
open curves: n u for upwardly convex/concave curves;
   closed curves: o p y e
miscellaneous smooth curve: ~
diacritical marks:
line end points: I L {} N U Y In this way the scribble shown in FIG. 1 would be encoded as: L!p<>olu>olU Although the scribble shown in FIG. 1 seems to have 11 knot points, there are in fact 12 knot points because two knot points are superimposed at 11 on the character 'a'.

The code is stored as a simple string with one character label for each knot point.

The syntactic matcher coding algorithm has the task of generating the label string from the input ink representation. The ink to be coded has already been debunched, dehooked, filtered and polygonally resampled as described above and the knot points have been detected.

The core algorithm takes a single stroke (ink between pen down and pen up):

label stroke:
   if isDiacritical(stroke) then emit '.' else
      label start of stroke
      for each interior knot point in stroke {label knot}
      label end of stroke Each of the component parts of this algorithm use several heuristically set thresholds. These thresholds can be chosen experimentally by comparison with a manual labelling of a data set and are not too critical. It is not important if the algorithm, for example, labels a knot as cusp where subjectively it is more like a smooth curve. What matters is that its decision points are sufficiently stable across multiple instances of the same word from the same author.

The components of the syntactic matcher algorithm will now be described in more detail.

isDiacritical

A stroke is regarded as a diacritical stroke (and thus labelled by .) if:

1. it is simple and small (it has less than 5 knots, and the distance between its start and end is less than D and the maximum deviation of the stroke from a straight line is less than D), or
2. it is very simple and small or short & horizontal (it has only 2 knots and either the length is less than D or both the maximum deviation of the stroke from a straight line is less than D and the stroke is within 30° of the horizontal), where the arbitrary limit D is defined by D=h/15 where h is the height of the overall scribble being coded.

These criteria are specific to English text. However, diacritical marks are not very important in the matching process so the accuracy of this part of the algorithm is not critical.

A note on angles

In case 2 of the diacritical filter and in several of the steps described below, there is a need to test angles. In the implementation of this algorithm, one byte is used to store angle codes so that angles of 0, 64, 128, 192 degrees correspond to up, right, down and left respectively. Since the ink trace is ordered, the direction in which the pen is moving is known and, say, upward strokes can be distinguished from downward strokes. In all of the subsequent pseudo-code definitions of the algorithms, this angle representation will be used.

label start of stroke

To label the start of the stroke we use:

label start of stroke:

test angle $\alpha$ of the first polygonal segment $\alpha \in [-40, 40]$ ⇒ emit '$L$' (down stroke)
$\alpha \in (40, 100)$ ⇒ emit '}' (right stroke)
$\alpha \in [100, 156]$ ⇒ emit '|' (up stroke)
$\alpha \in (156, 216)$ ⇒ emit '{' (left stroke)

Thus the angles are tested symmetrically about the main directions but with a slightly wider window for the down strokes.

label end of stroke

Some line ends occur in what could otherwise have been ligatures in cursive strokes and the aim is to label them as such. The heuristics used are:

label end of stroke:

d=(angle last polygonal segment)−(angle last but one segment)

test angle $\alpha$ of the last polygonal segment $\alpha \in [-40, 40]$ ⇒ emit '$L$' (down stroke)
$\alpha \in (40, 100)$ ⇒ if $d > 0$ then emit '$N$' else emit '$U$' (right stroke)

$\alpha \in [100, 156]$ ⇒ emit '|' (up stroke)
$\alpha \in (156, 216)$ ⇒ if $d > 0$ then emit '$Y$' else emit '{' (left stroke)

This is essentially the same as labelling the start of the strokes except that the horizontal ends points have slightly different labels according to whether they are turning upwards or downwards.

label knot

This final component of the labelling algorithm is the labelling of interior knots points, i.e. knots which are not at the start or end of the stroke.

label knot:

if isCusp then if isCusp then test angle $\alpha$ of the cusp $\alpha \in [-40, 40]$ ⇒ emit '$l$' (down stroke)
    $\alpha \in (40, 100)$ ⇒ emit '>' (right stroke)
    $\alpha \in [100, 156]$ ⇒ emit '!' (up stroke)
    $\alpha \in (156, 216)$ ⇒ emit '<' (left stroke)

else if isSmoothInflexion then emit '~' else if isPositive & isDown then      emit '$y$'
if isNegative & isUp then      emit '$e$'
if isLoop & isPositive then      emit '$p$'
if isLoop & isNegative & isClosed then      emit '$o$'
otherwise
    if isUp then      emit '$n$'
    if isDown then      emit '$u$'

There are several heuristic tests which are used in the above algorithm:

isCusp

Figure 7:
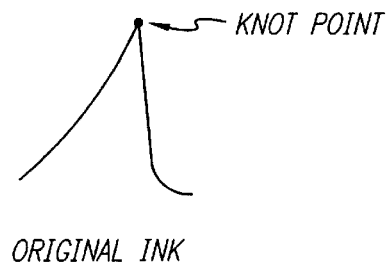
FIG. 7 illustrates a cusp.
Figure 8:
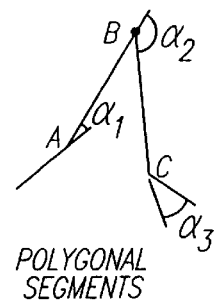
FIG. 8 illustrates the angles on polygonal segments.

A cusp is defined as a knot having a sharp angle change in comparison to the rate of angle change on either side of the knot. Where "angle change" is the difference in angle between the polygonal segments on either side of the point. FIG. 7 illustrates a cusp and FIG. 8 shows the relevant angles. A cusp metric is used as follows:

$$c = \left[ \alpha_2 - \frac{(\alpha_1 + \alpha_3)}{2} \right]$$

The isCusp test returns 'true' if the cusp metric c is greater than a given threshold (currently set to 70).

isSmoothInflexion

This tests for smooth inflexion points in the ink, ie. points where the curvature change is small and the sign of the curvature switches across the knot. Using the angles shown in FIG. 8 again, isSmoothInflexion returns true if:

$(c<40) \wedge (\text{sign}(\alpha_1) \neq \text{sign}(\alpha_3))$.

isPositive/isNegative

These simply tell us if the angle of the ink is increasing or decreasing. Again using the notation from FIG. 8, isPositive returns true if $\alpha_2 > 0$; isNegative is just the inverse.

isDown/isUp

These test the direction of the normal to the ink at the knot point. For these purposes the normal angle β is treated as simply the average of the two direction vectors AB and CB in FIG. 8.

isDown returns 'true' if β∈[100,190], isUp returns 'true' if β∈[−40,60]. These tests are asymmetric reflecting a slight bias towards slanted writers.

isLoop/isClosed

Figure 9A:
FIGS. 9a and 9b illustrate an open loop and the relevant measurements respectively.
Figure 9B:
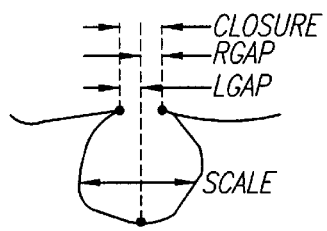

The purpose of these predicates is to distinguish between open curves ('u' and 'n') and their closed equivalents ('o' and 'p'). These tests examine the ink over the whole stretch from the previous knot point to the next knot point and locates the points of minimum and maximum×value. FIG. 9a shows an open curve having three knot points. Four measures are taken as shown in FIG. 9b. If either lgap or rgap would be negative they are set to zero in the subsequent calculations.

isLoop returns 'true' if $$\left(\frac{lgap}{scale} < 0.15\right) \vee \left(\frac{rgap}{scale} < 0.15\right)$$

isClosed returns 'true' if $$\left(\frac{closure}{scale} < 0.55\right)$$

Matching is based on string edit distance as described earlier. The set of insertion, deletion and substitution costs are set to cope with both variability in writing style (e.g. breaks in ligatures) and instability in the labelling algorithm (e.g. the weakness of the loop tests which might label 'u' as 'o' and vice versa). The procedure for setting the costs is as follows:

1. Manually define an initial set of costs.
2. Use this set of costs to find the minimum cost edit sequence between each pair in an extensive test database of word pairs.
3. Measure the relative frequency, $p_i$ with which each symbol or symbol pair is substituted, inserted and deleted.
4. Update the costs using the formula: $c_i = -\log p_i$ for each symbol or symbol pair.
5. Test the updated costs for performance on a test set. If performance has improved further, go to step 2 else exit with prior cost set.

The result is a table of fixed costs that reflect the probability of local variability, with likely deformations such as that from a loop to a cusp incurring low costs. In practice, the first manual setting of the costs may be sufficiently accurate that only one cycle of iterative improvement is needed to generate the final cost table.

Word Shape Matcher

Figure 10:
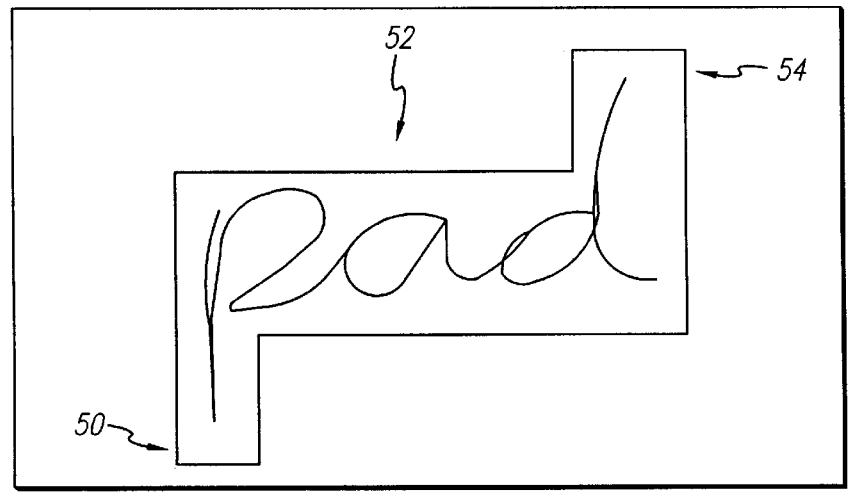
FIG. 10 relates to the word shape matcher encoding.

The next embodiment to be described is the word shape matcher. The word shape matcher uses a representation of the overall shapes of scribbles, reflecting the pattern of ascenders and descenders in their outer contours, eg as shown in FIG. 10. In FIG. 10 the word 'pad' is shown starting with a descender 50, continuing with a region 52 of normal character height and ending with an ascender 54.

The coder generates a code vector of integers representing the normalized heights of knots taken in time order. Knot heights are normalized relative to a (perhaps sloping) median line, and to the mean knot height for that scribble.

The coding algorithm is given in outline below:
1. Clear the code string
2. Project the y-density histogram of the scribble and find its median value
3. Find the mean vertical distance of knots from the median
4. For each knot in time order
    4.1 Subtract the median value from the height of the knot
    4.2 Divide this result by the mean value found in step 3
    4.3 Append this result to the end of the code string.

More formally, a wordshape code is defined as a sequence S of N integers $S_i$ in time order, such that $S = S_1, S_2, \ldots S_N$ where $$S_i = \left\lfloor \frac{y_i - y_{median}}{y_{mean}} \right\rfloor$$

and $y_i$ is the value of the y-coordinate of knot i, $y_{median}$ is the y-coordinate of the median line of the scribble at the same x-coordinate as knot i, and $$y_{mean} = \left\lfloor \frac{1}{N} \sum_{i=1}^{N} |y_i - y_{median}| \right\rfloor$$

is the mean vertical distance of knots from the median, these parameter being indicated in FIG. 11.

It is very likely that two scribbles to be compared will have different global positions relative to the origin of the coordinate system used to define the path of the ink within the scribbles. For example, the entry form for a scribble table may lie in the lower half of a tablet used to capture ink whereas the entry form for the query scribble may lie in the upper half. This problem can be overcome by expressing the height of a knot relative to the median line of the scribble. The median line is found by projecting the density of the scribble along the y-axis in a histogram 60 as illustrated in FIG. 12. The height of the median line 62 is then taken to be the midpoint of the histogram bin containing the point for which there are equal numbers of other points with greater and lesser heights.

The density histogram is constructed by resampling the scribble at equidistant intervals along its path and counting the number of times that the y-coordinates of the resampled points fall into each of the histogram bins. Normalization is fairly insensitive to the number and width of bins. 50 bins spread uniformly over the height of the scribble are used.

It is also very likely that two scribbles to be compared will be of different sizes. Scale invarience is achieved by expressing the distance of a knot from the median relative to the mean distance from the median of all the knots in the scribble. Informally, this measure relates to the variance of the knot distances from some central position. A doubling in the scale of a piece of scribble will double the size of this factor, so achieving the desired normalization. The median of the density histogram rather than its mean is used as the central position because of its lower sensitivity to outlier knots resulting from extraordinarily long ascenders or descenders.

Similarly, it is likely that the baselines of two scribbles to be matched will not be at the same angle to the horizontal. A partial robustness to varying slope can be achieved by the method illustrated in FIG. 13.

In the approach illustrated in FIG. 13, the bounding box 64 of the scribble is split by the vertical line 65 into two equal sized regions—region 1 and region 2. A density histogram is constructed (as described above) separately for each region to find their respective medians. The median for region 1 is known as the 'leading median' 66 and the median for region 2 is known as the trailing median 68.

The sloping median 70 for the entire scribble is then taken to be that line which passes through the intersections of the leading median 66 and the left-most edge of the bounding box 64 of the scribble, and of the trailing median 68 and the right-most edge of the bounding box 64.

This approach does not give a good estimate of the actual slope of the baseline of a scribble's relative to the horizontal. On any particular scribble, the pattern of ascenders and descenders is likely to bias the estimate. However, for scribble matching, only an estimate of the relative slope of two pieces of scribble is needed, which is reliable because the patterns of ascenders and descenders are the same in the correctly matching scribbles.

The matcher again uses the string edit distance metric. Given this approach, it is necessary to define the costs of the primitive insertion, deletion and substitution operators. Since the elements of the code strings are integers, the operator costs may be defined as simple arithmetic functions, ie Substitution cost $s(c_i^1, c_j^2) = w\ (c_i^1, c_j^2) = |c_i^1 - c_j^2|$
Insertion cost $i(c_i^1) = w(c_i^1, 0) = |c_i^1|$
Deletion cost $d(c_j^2) = w(0, c_j^2) = |c_j^2|$ where $c_{in}$ represents element i of code string n.

Figures 14, 15, 16:
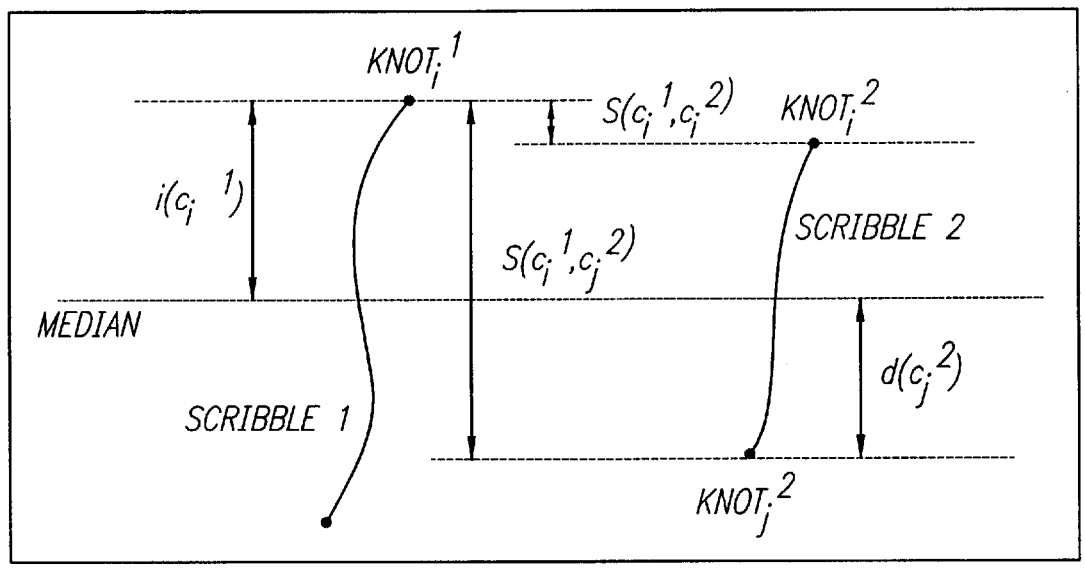
FIG. 14 shows edit costs in connection with the word matcher.
FIG. 15 is a table of substitution costs for the elastic matcher.
FIG. 16 is a table of insertion/deletion costs for the elastic matcher.

These costs are illustrated in FIG. 14, in which it is assumed for clarity that the two scribbles share a common median.

It may be seen that $s(c_i^1, c_j^2) \leq i(c_i^1) + d(c_j^2)$
that is, the substitution cost between two knots is always less than or equal to the cost of deleting one and inserting the other.

The lowest cost edit sequences will tend to be those containing mostly substitutions of knots with similar heights. The substitution of a knot that lies at the extreme of an ascender (or descender) with any other kind of knot, or its deletion or insertion, will incur a high marginal cost and tend to increase overall matching distance. Hence, the lowest overall matching distances will indeed tend to be those between scribbles with similar patterns of ascenders, descenders and body characters, as intended. Moreover, the insertion and deletion of knots close to the median line will incur low marginal cost and will therefore not greatly affect overall matching distance. Hence, this matcher will be fairly robust to instability in the placement of knots within body characters, and in the use of ligatures, further reflecting the emphasis on the overall shape of a scribble rather than its internal details.

Elastic Matcher

The elastic shape matcher matches the shape of the entire scribble not just the shape at the knot points.

It is assumed that the scribbles to be compared are measured with respect to some standard axes, e.g. by locating the origin at their respective left bottom corners. The sheer number of sample points and the natural variation over multiple occurrences precludes the direct use of these points to compute a measure of similarity efficiently. Instead, the aim is to generate a set of features that are more conveniently compared.

A natural source of variation for multiple occurrences of a scribble is the possibility that a subset of the strokes was entered in different order. The most common occurence is compensated for by filtering diacritical marks, such as the dot in an i and the short cross in a t, by not using these short strokes for comparison. These strokes are determined as discussed in the section above headed 'isDiacritical'.

Penlifts serve as separators for strokes and are useful for disambiguating certain stroke sequences which may have similar pendown geometry. However, they may not occur repeatably, and two specimens of the same scribble may differ in the number and position of penlifts. Penlifts are recorded as separators between two point sequences.

The stroke sequence is encoded by a sequence of shape code vectors generated from the point sequences by the following process:

Segmentation and Subsampling

A stroke, i.e. a sequence of points between two penlifts, is segmented using the velocity minima information as described above in connection with the resampling preprocessing step. To reduce matching complexity, segments demarcated by the velocity minima are subsampled, approximating the segment by a set of straight lines using polygonal resampling.

Coding the Subsampled Points

The following information is recorded for each of the points in the subsampled space:

1. Relative y displacement from a corner of the bounding box.
2. The angle θ of the tangent to the curve at the point (if this is a penlift, we compute the angle between the last point of the previous stroke and the first point of the next)

where $$\theta = \operatorname{atan}\left[\frac{y - y'}{x - x'}\right]$$

3. An indication of whether the point is a knot, a penlift or a polygonally subsampled intermediate point.

This information is appropriately quantized to optimize storage requirements versus accuracy. Current settings use 6 bits and a sign bit for the y displacement and 6 bits and a sign bit for the tangent angle. In case of a penlift, the current point is considered to be the first point of the stroke following the penlift. More formally, the shape code for a stroke sequence is represented by a vector of the following type:

| $y - \bar{y}$ | $\operatorname{atan}\left(\frac{y - y'}{x - x'}\right)$ | penup? | knot-point? |
|---|---|---|---|

1. (x,y) denotes the current point being examined, and derivative(x,y) denotes the approximate magnitude of pen velocity at the point.
2. (x',y') denotes the previous point.
3. centroid(x,y) denotes the centroid of the stroke sequence.
4. penup? is a boolean indicating a penlift.
5. knot-point? is a boolean indicating if the coded point was identified as a velocity minimum. It is not meaningful if penup? is set.

Elastic shape matching uses the same dynamic programming algorithm as the syntactic matcher and the word shape matcher. In effect it attempts to deform the curve in order to attempt a match with the prototype. The difference in geometry of two strokes are computed by a linear weighted sum of the differences in position, and the tangent to the pen trajectory at each sample point of the stroke. Differences can be caused by:

1. Difference in location of corresponding points on the two strokes
2. An extra point on one of the two strokes.

In cases where the two points in question are both knots or subsampled points, the substitution cost between point p in one stroke and a corresponding point q in the prototype is defined as:

$$subs(p,q) = m(y_p - y_q) + n(\theta_p - \theta_q)$$

where m and n are appropriately chosen weights.

The cost of deforming a polygonally resampled point into a penlift is higher than matching two resampled points, reflecting the greater disparity involved. Insertion of points also incurs a penalty that is higher than the deformation cost. The current quantization levels and weights for substitution cost are shown in the table of FIG. 15.

In effect the high cost of substituting a polygonal sample point for a knot point encourages the matching algorithm to try to line up knot points in the two scribbles, even if it means requiring a number of insertions or deletions of intermediate polygonal sample points.

Insertion and deletion costs are symmetrical. The insertion/deletion cost for a knot or polygonally resampled point is equal to the maximum substitution cost for a knot and polygonally resampled point pair. The cost for a penlift is equal to the penalty for substituting a penlift for a polygonally resampled point. Example costs are shown in the table of FIG. 16.

The match process is then the standard edit distance algorithm described above but using these cost functions.

A possible modification of the elastic matcher is to use it as a partial matcher ie. to use only some of the available ink, say 50% or the ink spanning the last n knot points. This permits a trade off between speed and accuracy. For example, just matching the leading ink enables fast identification of all scribbles with similar prefixes which is sufficient for some applications.

In practice, a plurality of scribble matching algorithms are combined to maximise speed and accuracy. For example, a known pruning algorithm may be used to reduce the search space so as to speed up subsequent matching stages. The pruner would discard those entries in the search table which are too dissimilar to the query scribble to be match candidates. Since a mistake by the pruner cannot be recovered later in the matching process, normally a very conservative pruning strategy would be used. Typically, a pruner at best halves the search space. Next, known linear matching algorithms (such as profile, angle, histogram matchers) are used further to reduce the search space to a relatively small number N of match candidates. Finally the relatively computationally expensive dynamic programming scribble matchers according to the invention are used on the remaining N candidates and their combined scores used to generate the final scoring.

The three scribble matchers described above may be combined in many ways, for example in a pipeline, or in parallel. One possible combination is based on a linear sum of matching distances. This combination technique simply uses each matcher to find a distance from the query scribble to every entry in the scribble table, normalizes the distances to a common scale, and sums them to produce an overall distance $d_n$ as shown in FIG. 17.

The normalised distance $d_n$ is found by subtracting $\eta$, the mean best match distance for that matcher from $d_m$, the distance found for a given table entry, and dividing by $\sigma$, the standard deviation on that matcher's best match distance, ie $$d_n = (d_m - \eta)/\sigma$$

The values for $\eta$ and $\sigma$ can be found by observing best match distances for writers drawn from a development test set.

The effect of normalization is to place all match distances on a single scale that may be interpreted as the degree of confidence of match. Thus the overall normalized distance could be used to reject low confidence matches. In practice, the gap between the best and second-best match is found to provide a better rejection heuristic.

The methods of scribble matching according to the invention have been found to enable high matching accuracy to be achieved whilst retaining acceptable matching speed. Speed and accuracy requirements vary according to applcation and the matchers may be combined as explained above according to requirements.

All of the methods described above are implemented in software. It will be understood that hardware implementations are also possible in dedicated devices.

It will be understood that the invention is not limited to a particular input means for entering scribble and may cover methods and devices utilising pen input, finger input, mouse input and any other way of inputting scribble.

We claim:

1. A method of matching samples of electronically stored freehand input with other stored samples of freehand input, the method comprising:

locating velocity minima in each said freehand input sample;

coding each said freehand input sample by a sequence of symbols each representing a feature of the freehand input sample at a velocity minimum which is one of said velocity minimum; and matching each said sequence of symbols against codes of said other stored samples of freehand input using a string edit distance metric;

wherein at least one of said freehand input samples is a figure exceeding a single text character, and said matching is completed for each said freehand input sample without identification of said freehand input sample as a sequence of individual text characters.

2. A method according to claim 1 wherein the feature encoded is a shape of the freehand input in a region of the velocity minimum and the symbols represent a set of shape characteristics, and wherein edit costs, used to calculate the string edit distance, are dependent on the shape characteristics.

3. A method according to claim 2 wherein the set of shape characteristics comprises; cusp, open curve, closed curve and line end.

4. A method according to claim 3 wherein substitution costs are used in calculating the string edit distances, and substitution costs between line ends and other shape characteristics are lower than substitution costs between shape characteristics which are not line ends.

5. A method according to claim 3 wherein the set of shape characteristics further comprises miscellaneous smooth curves and diacritical marks, and insertion and deletion costs for these shape characteristics are lower than insertion and deletion costs for shape characteristics which are not miscellaneous smooth curves or diacritical marks.

6. A method according to claim 2 wherein the edit costs are also dependent on a probability of occurrence of corresponding edit operations.

7. A method according to claim 1 comprising encoding a normalized height of the freehand input at the velocity minima relative to a reference line, wherein the height is encoded on a continuous scale and edit costs, used to calculate the string edit distance, are dependent on the encoded heights.

8. A method according to claim 7 wherein edit costs for deletions and insertions correspond to a magnitude of encoded heights of relevant velocity minima and edit costs for substitutions correspond to a difference in height of relevant velocity minima.

9. A method according to claim 1 comprising:
coding the freehand input by a sequence of symbols which also represent features of points intermediate the velocity minima, wherein the intermediate points are generated by a resampling of the freehand input between velocity minima;
providing a point classification of the velocity minima and the intermediate points, said classification being either a break in electronic ink, a velocity minimum or an intermediate point;
encoding points including the velocity minima and the intermediate points by a triple containing a normalised height of the point, an angle to a tangent of the freehand input at the point, and said point classification; and
calculating the string edit distance using edit costs dependent on differences in height, angle and point classification.

10. A method according to claim 9 wherein the resampling comprises polygonal resampling.

11. A method according to claim 2, further comprising the steps of:
encoding normalized height of the freehand input at the velocity minima relative to a reference line, wherein the normalized height is encoded on a continuous scale and the edit costs are dependent on the encoded heights; and
calculating a weighted sum of match scores obtained from matching said sequence of symbols where said symbols represent a set of shape characteristics and from matching said sequence of symbols where said symbols represent a normalized height of the freehand input at the velocity minima relative to a reference line, to obtain an overall match score.

12. A method according to claim 11, wherein the step of matching the sequence of symbols against codes of other samples of freehand input includes a step of reducing match candidates of said electronically stored freehand input by implementation of a pruning algorithm and a linear matching algorithm.

13. A method according to claim 2, further comprising the steps of:
coding the freehand input by a sequence of symbols which also represent features of points intermediate the velocity minima, wherein the intermediate points are generated by a resampling of the freehand input between velocity minima;
providing a point classification of the velocity minima and the intermediate points, said classification being either a break in electronic ink, a velocity minimum or an intermediate point;
encoding points including the velocity minima and the intermediate points by a triple containing a normalised height of the point, an angle to a tangent of the freehand input at the point, and said point classification;
using edit costs dependent on differences in height, angle and point classification; and
calculating a weighted sum of match scores obtained from matching said sequence of symbols where said symbols represent a set of shape characteristics and from matching said sequence of symbols where said symbols represent said triple, to obtain an overall match score.

14. A method according to claim 13, wherein the step of matching the sequence of symbols against codes of other samples of freehand input includes a step of reducing match candidates of said freehand input sample by implementation of a pruning algorithm and a linear matching algorithm.

15. A method according to claim 9, further comprising the steps of:
encoding normalized height of the freehand input at the velocity minima relative to a reference line, wherein the normalized height is encoded on a continuous scale and the edit costs are dependent on the encoded heights; and
calculating a weighted sum of match scores obtained from matching said sequence of symbols where said symbols represent the normalized height of the freehand input at the velocity minima relative to a reference line, and from matching said sequence of symbols where said symbols represent said triple, to obtain an overall match score.

16. A method according to claim 15, wherein the step of matching the sequence of symbols against codes of other samples of freehand input includes a step of reducing match candidates of said electronically stored freehand input by implementation of a pruning algorithm and a linear matching algorithm.

17. A method according to claim 2, further comprising the steps of:
encoding normalized height of the freehand input at the velocity minima relative to a reference line, wherein the normalized height is encoded on a continuous scale and the edit costs are dependent on the encoded heights;
coding the freehand input by a sequence of symbols which also represent features of points intermediate the velocity minima, wherein the intermediate points are generated by a resampling of the freehand input between velocity minima;
providing a point classification of the velocity minima and the intermediate points, said classification being either a break in electronic ink, a velocity minimum or an intermediate point;
encoding points including the velocity minima and the intermediate points by a triple containing a normalised height of the point, an angle to a tangent of the freehand input at the point, and said point classification;
using edit costs dependent on differences in height, angle and point classification; and
calculating a weighted sum of match scores obtained from matching said sequence of symbols where said symbols represent a set of shape characteristics, from matching said sequence of symbols where said symbols represent the normalized height of the freehand input at the velocity minima relative to a reference line, and from matching said sequence of symbols where said symbols represent said triple, to obtain an overall match score.

18. A method according to claim 17, wherein the step of matching the sequence against codes of other samples of freehand input includes the step of reducing match candidates of said electronically stored freehand input by implementation of a pruning algorithm and a linear matching algorithm.

19. An apparatus for matching samples of electronically stored freehand input with other stored samples of freehand input, said apparatus comprising:
a velmin locator for locating velocity minima in each said freehand input sample;
a freehand input encoder responsive to velocity minima received from said velmin locator, said freehand input encoder coding each said freehand input sample by a sequence of symbols, each symbol representing a feature of the freehand input at a velocity minimum which is one of said velocity minima; and a matcher responsive to said sequence of symbols received from said encoder, said matcher matching the sequence of symbols against codes of other samples of freehand input by using a string edit distance metric;

wherein at least one of said freehand input samples is a figure exceeding a single text character, and said matcher matches each said freehand input sample without identifying it as a sequence of individual text characters.

20. A method according to claim 1, wherein matching the sequence of symbols against codes of other samples of freehand input includes the step of reducing match candidates of said electronically stored freehand input by implementation of a pruning algorithm and a linear matching algorithm.

21. A method of matching samples of electronically stored freehand input, said method comprising:

locating velocity minima in a first freehand input sample;

coding the first freehand input sample by a sequence of symbols each representing a feature of the first freehand input sample at a velocity minimum which is one of said velocity minima;

storing said coded first freehand input sample;

repeating said steps of locating velocity minima, coding and storing for each of a plurality of further first freehand input samples to obtain a stored set of coded first freehand input samples;

locating velocity minima in a second freehand input sample;

coding the second freehand input sample by a sequence of symbols each representing a feature of the second freehand input sample at a velocity minimum; and matching the sequence of symbols from the second freehand input sample against the stored set of coded first freehand input samples using a string edit distance metric;

wherein at least one of said first freehand input samples is a figure exceeding a single character, and said matching is completed without identification of said at least one of said first freehand input samples sequence of individual text characters.

22. A method as claimed in claim 21, wherein said steps of coding the first freehand input samples and of coding the second freehand input sample comprise coding a shape of the freehand input in a region of the velocity minimum and the symbols represent a set of shape characteristics and wherein edit costs, used in calculating the sting edit distance metric, are dependent on the shape characteristics.

23. A method as claimed in claim 21, wherein said steps of coding the first freehand input samples and of coding the second freehand input sample comprise encoding normalized height of the freehand input at the velocity minima relative to a reference line, wherein the normalized height is encoded on a continuous scale and edit costs, used in calculating the string edit distance metric, are dependent on the encoded heights.

24. A method as claimed in claim 21, wherein said steps of coding the first freehand input samples and of coding the second freehand input sample comprise:

coding each said freehand input sample by a sequence of symbols which also represent features of points intermediate the velocity minima, wherein the intermediate points are generated by a resampling of the freehand input between velocity minima;

providing a point classification of the velocity minima and the intermediate points, said classification being either a break in the electronic ink, a velocity minimum or an intermediate point;

encoding points including the velocity minima and the intermediate points by a triple containing a normalised height of the point, an angle to a tangent of the freehand input at the point, and said point classification.

25. An apparatus as claimed in claim 19, further comprising storage for selected samples of freehand input coded by said freehand input encoder, wherein the matcher is adapted to match the output of the freehand input encoder against codes of the selected samples of freehand input stored in the storage.

26. A method of matching a test sample of electronically stored freehand input with other stored samples of freehand input, said method comprising:

locating velocity minima in the test sample of freehand input;

coding the test sample of freehand input according to a plurality of coding steps, wherein each coding step comprises coding the test sample of freehand input by a sequence of symbols each representing a feature of the test sample of freehand input at a velocity minimum which is one of said velocity minima;

for each sequence of symbols generated by one of said plurality of coding steps, matching the sequence of symbols against codes of other samples of freehand input using a string edit distance metric to provide a match score; and calculating a weighted sum of the match scores to obtain an overall match score for each of the other samples of freehand input;

wherein the method of matching is performed on a plurality of test samples at least one of which is a figure exceeding a single text character, and matching does not include identification of any of said plurality of test samples as a string of individual text characters.

27. A method as claimed in claim 26, wherein one of the plurality of coding steps consists of coding a shape of the freehand input in a region about the velocity minimum and the symbols represent a set of shape characteristics and wherein edit costs, used it calculating the string edit distance in the matching step, are dependent on the shape characteristics.

28. A method as claimed in claim 26, wherein one of the plurality of coding steps consists of encoding normalized heights of the freehand input at the velocity minima relative to a reference line, wherein the normalized heights are encoded on a continuous scale, and wherein edit costs, used in calculating the string edit distance in the matching step, are dependent on the encoded heights.

29. A method as claimed in claim 26, wherein one of the plurality of coding steps consists of:

coding the freehand input by a sequence of symbols which also represent features of points intermediate the velocity minima, wherein the intermediate points are generated by a resampling of the freehand input between velocity minima;

providing a point classification of the velocity minima and the intermediate points, said classification being either a break in the electronic ink, a velocity minimum or an intermediate point;

encoding points including the velocity minima and the intermediate points by a triple containing a normalised height of the point, an angle to a tangent of the freehand input at the point, and said point classification.

* * * * *

UNITED STATES PATENT AND TRADEMARK OFFICE
CERTIFICATE OF CORRECTION

PATENT NO. : 6,018,591
APPLICATION NO. : 08/974704
DATED : January 25, 2000
INVENTOR(S) : Richard Hull et al.

Page 1 of 1

It is certified that error appears in the above-identified patent and that said Letters Patent is hereby corrected as shown below:

Claim 1, Column 16, line 32, after "velocity" delete "minimum" and insert therefor --minima--

Signed and Sealed this

Twenty-first Day of October, 2008

JON W. DUDAS
*Director of the United States Patent and Trademark Office*